United States Patent
Tapia et al.

(10) Patent No.: US 10,164,850 B2
(45) Date of Patent: Dec. 25, 2018

(54) WIRELESS COMMUNICATION DATA ANALYSIS AND REPORTING

(71) Applicant: TUPL, Inc., Snoqualmie, WA (US)

(72) Inventors: Pablo Tapia, Snoqualmie, WA (US); Rafael Sanchez-Mejias, Dallas, TX (US)

(73) Assignee: TUPL, INC, Snoqualmie, WA (US)

( * ) Notice: Subject to any disclaimer, the term of this patent is extended or adjusted under 35 U.S.C. 154(b) by 96 days.

(21) Appl. No.: 15/141,664

(22) Filed: Apr. 28, 2016

(65) Prior Publication Data

US 2017/0078171 A1 Mar. 16, 2017

Related U.S. Application Data

(60) Provisional application No. 62/216,956, filed on Sep. 10, 2015.

(51) Int. Cl.

| | |
|---|---|
| *H04L 12/26* | (2006.01) |
| *H04W 24/02* | (2009.01) |
| *H04W 24/08* | (2009.01) |
| *H04L 29/06* | (2006.01) |
| *H04L 12/24* | (2006.01) |

(52) U.S. Cl.
CPC .......... *H04L 43/08* (2013.01); *H04L 41/0631* (2013.01); *H04L 43/065* (2013.01); *H04L 43/067* (2013.01); *H04L 65/1016* (2013.01); *H04W 24/02* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 2009/0055382 A1* | 2/2009 | Kerschbaum | G06Q 10/06 |
| 2013/0182700 A1* | 7/2013 | Figura | H04L 43/08 370/352 |
| 2016/0373944 A1* | 12/2016 | Jain | H04W 24/02 |
| 2017/0041815 A1* | 2/2017 | Fernandez Arboleda | H04L 41/064 |
| 2017/0186019 A1* | 6/2017 | Loeb | G06Q 30/016 |

* cited by examiner

*Primary Examiner* — Christine T Duong

(57) ABSTRACT

A communication analytics engine that executes in conjunction with a data collection platform may provide a unified and scalable solution for call data aggregation and processing. A data collection platform may establish a communication connection with a wireless carrier network. The data collection platform may collect call data of multiple user devices via the communication connection, in which the multiple user devices may use the wireless carrier network to initiate and receive calls to one or more additional devices. The data collection platform may convert the call data into a format that is readable by the communication analytics engine. The communication analytics engine may analyze the call data to generate analytic results that includes one or more key performance indicators (KPIs).

21 Claims, 6 Drawing Sheets

WIRELESS COMMUNICATION DATA ANALYSIS AND REPORTING

CROSS REFERENCE TO RELATED PATENT APPLICATION

This application claims priority to U.S. Provisional Patent Application No. 62/216,956, filed on Sep. 10, 2015, entitled "Big Data Machine Learning Technologies for Analyzing Call Data," which is hereby incorporated by reference in its entirety.

BACKGROUND

Voice over LTE (VoLTE) is the use Long-Term Evolution (LTE) wireless communication infrastructure to provide voice communication services. Since VoLTE is a relatively new technology, many wireless communication carriers have encountered limitations in analyzing and finding the root causes of problems experience by VoLTE customers. The problems may be issues such as call drops, network congestion and access failures, low mean opinion score (MOS) regarding call quality, etc. Such issues may result in shortened calls and repeated calls between same numbers within a short period of time. VoLTE performance issues may be difficult to troubleshoot using legacy network analysis methodologies that are developed for use with third generation (3G) mobile communication technology. As a result, the customer care operations of wireless communication carriers may be unable to properly resolve customer complaints regarding VoLTE services.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for analyzing call data to detect issues with wireless communication services that are provided by a wireless carrier network, and providing alerts regarding the detected issues. A communication analytics engine may receive call data from monitoring application on multiple user devices. The user devices may include smart phones, phoneblets, phablets, and/or so forth. In various embodiments, the communication analytics engine may be a custom analytics application that executes on top of a data aggregation and processing platform. The communication analytics engine may generate key performance indicators (KPIs) from the call data based on KPI configuration settings. Additionally, the communication analytics engine may generate alerts according to predefined alert rules. For example, a series of KPIs that are generated by the communication analytics engine over time may trigger an alert that an abnormal condition is developing with respect to some VoLTE-related infrastructure components of a wireless carrier network. In another example, an alert rule may generate an alert to a customer who is experiencing poor call performance at home that Wi-Fi calling is not enabled. In other instances, the KPIs that are calculated may provide information about calls at a subscriber level, in which the information may be related to call durations, call drops, call access failures, one-way audio situations, and/or so forth.

The implementation of the communication analytics engine to execute in conjunction with the data aggregation and processing platform may provide a unified and scalable solution for call data aggregation and processing. The data and aggregation and processing platform may enable the use of custom analytics engines to provide KPIs to a wireless carrier network for different corporate sectors, such as network development, operations, and customer care. The KPIs that are provided by the communication analytics engine from the call data may be otherwise overly burdensome or virtually impossible to manually obtain in a timely manner due to the large volume of call data that typically inundate a wireless carrier network. Further, the techniques may provide an advanced approach to customer care with proactive and individualized treatments of wireless subscribers in real time. The techniques described herein may be implemented in a number of ways. Example implementations are provided below with reference to the following FIGS. 1-5.

Example Architecture

Figure 1:
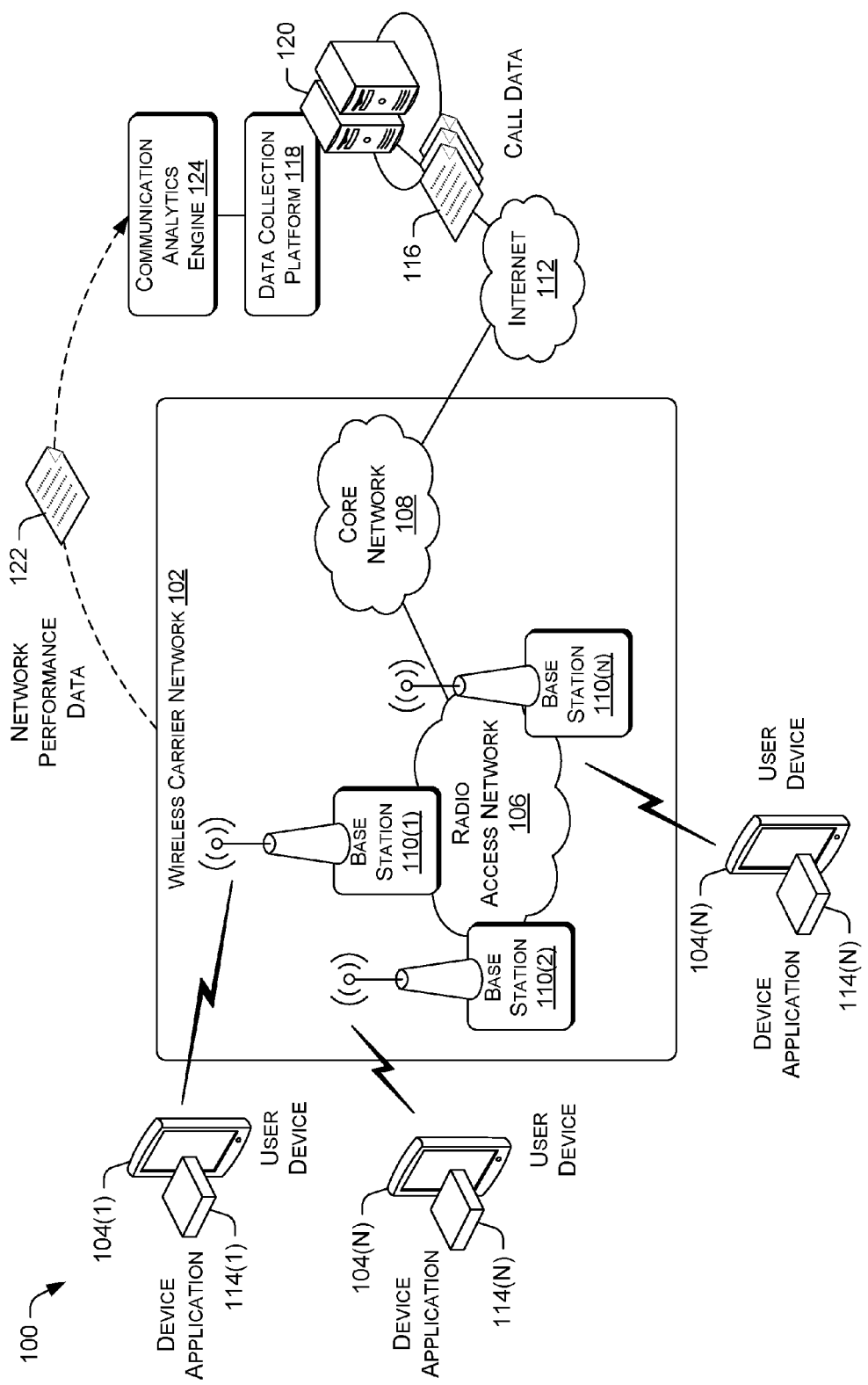
FIG. 1 illustrates an example architecture for performing wireless communication data analysis and reporting.

FIG. 1 illustrates an example architecture for performing wireless communication data analysis and reporting. The architecture 100 may include a wireless carrier network 102 that is operated by a wireless communication carrier or a service provider. The wireless carrier network 102 may provide a wide range of mobile communication services, as well as ancillary services and features, to subscribers and associated mobile device users. In various embodiments, the wireless carrier network 102 may provide wireless communication between user devices 104(1)-104(N). Further, the wireless carrier network 102 may also provide communications that involves the use of VoLTE between the user device 104(1)-104(N) and user devices that are external of the wireless carrier network 102. The user devices 104(1)-104(N) may include mobile handsets, smart phones, tablet computers, personal digital assistants (PDAs), smart watches, and/or electronic devices.

The wireless carrier network 102 may be implemented using multiple interconnected networks. In various embodiments, the wireless carrier network 102 may include multiple Radio Access Networks (RANs), such as the RAN 106. The RANs may be connected to each other via regional ground networks. In turn, the regional ground networks may be connected to a core network 108 by a wide area network (WAN). Each regional portion of the wireless carrier network 102, such as those serving the user devices 104(1)-

104(N) may include one or more RANs and a regional circuit and/or packet switched network and associated signaling network facilities.

The radio access network 106 may include a number of base stations, such as the base stations 110(1)-110(N). In some embodiments, the base stations 110(1)-110(N) may be in the form of eNodeB nodes. Each eNodeB node may include a base transceiver system (BTS) that communicates via an antennae system over an air-link with one or more user devices that are within range. The antenna system of an eNodeB node may include multiple antennae that are mounted on a radio tower to provide a coverage area. The BTS may send radio communication signals to user devices and receive radio communication signals from user devices. The radio access networks may carry the user communications for the user devices 104(1)-104(N) between the respective base stations 110(1)-110(N) and the core network 108.

The core network 108 may connect to a public packet data communication network, such as the Internet 112. Packet communications via the radio access network 106, the core network 108, and the Internet 112 may support a variety of services through the wireless carrier network 102. The Evolved Packet Core (EPC) of the radio access network 106 may use Evolved Packet System (EPS) bearer channels to route IP traffic from a gateway in the radio access network 106 to a user device. A bearer channel is an IP packet flow with a defined quality of service (QoS) between the Packet Data Network (PDN) Gateway (PGW) and the user device. The eNodeB nodes may be interconnected with each other by interfaces. The communication between eNodeB nodes may include Radio Resource Management (RRM) control data, which may manage multiple functions of the eNodeB nodes. These functions may include radio bearer control, radio admission control, radio mobility control, scheduling, and dynamic allocations of resources to user devices in both uplink and downlink.

The user devices 104(1)-104(N) may be equipped with device applications, such as the respective device applications 114(1)-114(N). Each of the device applications 114(1)-114(N) may collect call data from a corresponding user device as wireless communication calls are initiated at the user device or received at the user device. In various embodiments, each device application may obtain the call data from a corresponding user device via an IP Multimedia Subsystem (IMS) stack trace of the user device. The device applications 114(1)-114(N) may send collected call data 116 through the radio access network 106 to the core network 108, such that a data collection platform 118 may receive the call data 116 via a communication connection with the core network 108. For example, the communication connection may be the Internet 112, an intranet, or a combination of the Internet 112 and the intranet. The collected call data 116 may include VoLTE call data for VoLTE calls that are handled by the user devices 104(1)-104(N). In other embodiments, each device application may also obtain call data 116 in the form of non-VoLTE call data, such as circuit-switch call data, Wi-Fi call data, and/or so forth, from a corresponding user device. In additional embodiments, subscriber identity module (SIM) applets on the user devices 104(1)-104(N) may alternatively or concurrently send handset reports that include the call data 116 and/or network performance data to the core network 108. The call data collected by a device application or a SIM applet may include parameters, measurements, and/or metrics associated with incoming and outgoing calls as the calls are handled by a corresponding user device.

The data collection platform 118 may be implemented by one or more computing devices 120. In some embodiments, the computing devices 120 may be servers that are part of a computing cloud. The data collection platform 118 may include a cloud layer that controls hardware resources, and a data management layer that manages data processing and storage. The cloud layer may provide software utilities for managing computing and storage resources. In various embodiments, the cloud layer may provide a generic user interface for handling multiple underlying storage services (e.g., local servers, Amazon AWS, Digital Ocean, etc.) that stores the call data collected by the data collection platform 118. The cloud layer may also provide an integrated view of multiple servers and clusters from various providers, such as Hortonworks, Cloudera, MapR, etc.). Additionally, the cloud layer may provide monitoring utilities to oversee utilization of resources and alerts for managing data storage or processing capacity. Accordingly, the cloud layer may facilitate the deployment, configuration, and activation of local and cloud servers, as well as facilitate the deployment, configuration, and activation of applications and/or services.

The data management layer may include software utilities and databases that facilitate the acquisition, processing, storage, reporting, and analysis of data from multiple data sources. In various embodiments, the data management layer may provide an API that decouples backend data management elements from data processing elements, such that the data may be distributed and stored in different data stores. For example, these data stores may include Hadoop distributed File System (HDFS), Apache Spark, Apache HBase, and/or so forth. The API of the data management layer may be used by custom analytic engines and/or other third party tools to access the data in the different data stores. The data management layer may further include multiple data adaptors that are able to obtain multiple types of network performance data 122 from the wireless carrier network 102, such network performance data 122 may include RAN Operation Support System (OSS) counters, Call Detail Records (CDRs), VoLTE call traces, Session Initiation Protocol (SIP) trace data, Real-Time Transport Protocol (RTP) Control Protocol (RTCP) trace data, and/or other data.

A communication analytics engine 124 may execute on the data collection platform 118 to analyze the call data 116 and/or the network performance data 122 and provide call analysis reports and alerts. In various embodiments, the communication analytics engine 124 may generate key performance indicators (KPIs) from the call data based on KPI configuration settings. Additionally, the communication analytics engine may generate alerts according to predefined alert rules. For example, a series of KPIs that are generated by the communication analytics engine over time may trigger an alert that an abnormal condition is developing with respect to some VoLTE-related infrastructure components of the wireless carrier network 102. In another example, the communication analytics engine 124 may use an alert rule to alert a customer who is experience poor VoLTE call performance at home that Wi-Fi calling is not enabled. In other instances, the KPIs that are calculated may provide information about VoLTE calls at a subscriber level, in which the information may be related to call durations, call drops, call access failures, one-way audio situations, and/or so forth.

Example Computing Device Components

Figure 2:
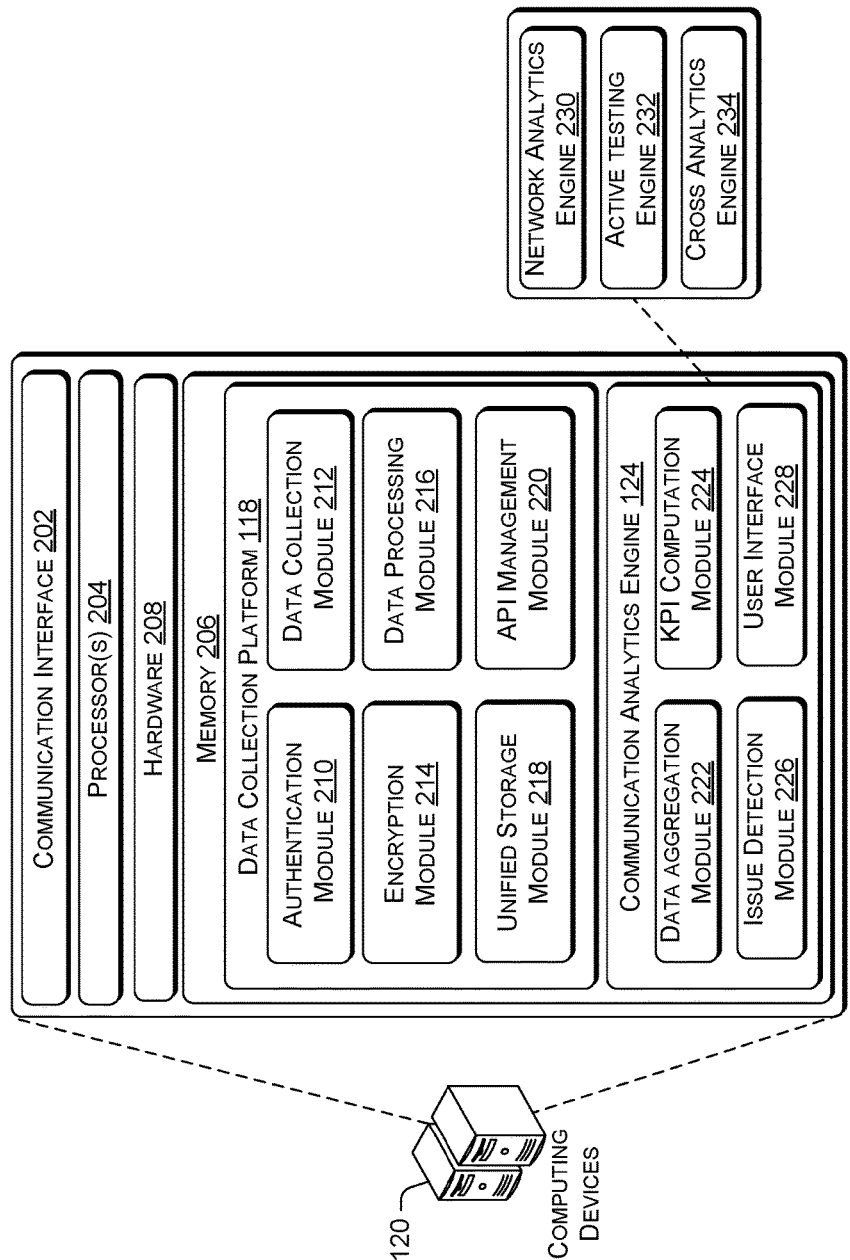
FIG. 2 is a block diagram showing various components of a communication analytics engine for performing wireless communication data analysis and reporting.

FIG. 2 is a block diagram showing various components of the communication analytics engine 124 for performing wireless communication data analysis and reporting. The data collection platform 118 and the communication analytics engine 124 may reside on one or more computing devices 120. The computing devices 120 may include a communication interface 202, one or more processors 204, memory 206, and hardware 208. The communication interface 202 may include wireless and/or wired communication components that enable the one or more computing devices 120 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 206 of the computing device 200 may implement the data collection platform 118 and the communication analytics engine 124. The data collection platform 118 may include an authentication module 210, a data collection module 212, an encryption module 214, a data processing module 216, a unified storage module 218, and an API management module 220. The unified storage module 218 may be a part of the cloud layer of the data collection platform 118, while the remaining modules may be parts of the data management layer of the data collection platform 118. The modules may include routines, program instructions, objects, and/or data structures that perform particular tasks or implement particular abstract data types. The authentication module 210 may perform credential management and automate authentication to provide secure access to applications and data that are stored on different wireless carrier network. For example, the authentication module 210 may authenticate the data collection platform 118 to the wireless carrier network 102 for the purpose of retrieving the call data 116 from the wireless carrier network 102.

The data collection module 212 may include a workflow scheduler that periodically checks for and retrieves newly available data from data sources, such as the wireless carrier network 102. In turn, the wireless carrier network 102 may be responsible for retrieving the call data 116 and other data from the device applications 114(1)-114(N) via data push or data pull techniques. The workflow scheduler may handle the extraction and the handling of the data based on configurable policies. For example, a configurable policy may specify the source data location, frequency of data retrieval, handling procedures for late arrival data, data retention period, and data disposal following an expiration of the data retention period. The handling procedures for the late arrival data may specify a predetermined cutoff period during which any data arriving late may be incorporated with data that is retrieved on time for processing.

In various embodiments, the data collection module 212 may employ file transfer protocol (FTP), Hypertext Transfer Protocol (HTTP) posts, direct network infrastructure element connection, and/or other data transfer techniques to obtain call data 116 from the device applications 114(1)-114(N) or data from the SIM applets on the user devices 104(1)-104(N). The call data 116 may be in the form of input data files, i.e., JavaScript Object Notation (JSON) records, which are received from the device applications 114(1)-114(N) on the user devices 104(1)-104(N). In some embodiments, the data collection module 212 may perform data integrity tests to verify that the content of the received data files are not corrupt. The data collection module 212 may also use data adaptors to interface with the core network 108 to collect network performance data 122 of the wireless carrier network 102.

The encryption module 214 may encrypt and/or decrypt sensitive data to provide additional data security. For example, the wireless carrier network 102 may encrypt the call data 116 via an asymmetric or symmetric encryption algorithm, and the encryption module 214 may decrypt the call data 116 using the same encryption algorithm. The data processing module 216 may implement adaptor-specific logics to decode the input data format into a metadata representation. Accordingly, the input data may be fed into other modules for analysis and storage. In various embodiments, the data processing module 216 may merge call data as embodied in the JSON records of a particular time period into an integrated data file. Subsequently, the data processing module 216 may interpret the information in the integrated data file into a converted format that is readable to the communication analytics engine 124.

The unified storage module 218 may store data across multiple virtual data storage clusters with redundancy, so that the data may be optimized for quick access. The stored data may include the input data files, i.e., the JSON records, the integrated data file that includes data in the converted format, calculated data from the communication analytics engine 124, and/or so forth. In various embodiments, the call data stored by the unified storage module 218 may include messages and configuration information of subscribers, in which the data are aggregated based on time, network infrastructure element, and/or user device model. The API management module 220 provides an API that may be accessed by other applications. Accordingly, the API may be used by the communication analytics engine 124 as well as other third-party application to access the data that received and stored by the data collection platform 118.

The communication analytics engine 124 may include a data aggregation module 222, a KPI computation module 224, an issue detection module 226, and a user interface module 228. The modules may include routines, program instructions, objects, and/or data structures that perform particular tasks or implement particular abstract data types.

The data aggregation module 222 may receive integrated data files of call data 116 from the data collection platform 118, in which the call data 116 may be in the converted format. In turn, the data aggregation module 222 may aggregate the received data into multiple data sets according to grouping parameters. The grouping parameters may include specific time periods (e.g., hourly, daily, etc.), routing network components, user device vendor types, user device models, and/or so forth. In other embodiments, the group parameters may be used to aggregate the call data 116 into multiple datasets that correspond to different levels of a telecommunication network hierarchy. For example, the call data 116 may be aggregated into data sets that correspond to a base station level, a Type Allocation Code (TAC) level, a service area level, and a geographical market level. The data aggregation module 222 may designate a data retention period for each dataset. Upon an expiration of the data retention period, the data in the corresponding dataset may be purged by the data aggregation module 222.

The KPI computation module 224 may compute a set of KPIs for the call data in each dataset based on a KPI configuration file. Thus, the KPI computation module 224 may be directed to compute new KPIs from the call data in each dataset through the modifications of existing KPI configuration files or the addition of new KPI configuration files. Additionally, the KPI computation module 224 may also perform other types of analysis on the call data in each dataset. For example, the KPI computation module 224 may generate KPIs for other types of calling, such as circuit-switched calling or Wi-Fi calling, that are performed by the user devices. In another example, the KPI computation module 224 may also perform analysis that compare the KPIs that are generated for these other types of calls to KPIs that are generated for the calls.

The issue detection module 226 may parse the generated KPIs and other collected data to automatically detect conditions based on condition detection rules and generate alerts based on alert rules. The detected conditions may include present performance issues with a user device or a network infrastructure element. The detected conditions may further include anomalies, or unexpected changes or deviations, in the performance of a user device or a network infrastructure element that deviates from a historical performance pattern or trend. In various embodiments, the detected conditions may include localized problems, device or core network problems, and device type problems. The localized problems may be problems that occur for specific users only at specific locations. Such localized problems may include a lack of a network signal or a lack of Wi-Fi calling, which may be detected based on low signal strength reported and lack of the Wi-Fi calling activation. Another localized problem be a signal dominance problem that is detected based on reports of low signal strength in a particular area, or a signal interference problem that is detected based on normal signal strength combined with poor signal-to-noise or noise-to-interference ratio. Congestion is a localized problem that may be detected based on network traffic reports from serving nodes, e.g., eNodeB nodes, in an area. The detection of a localized problem in the form of an out-of-service node may be performed based on network availability reports from serving nodes in an area. Alarm in a serving node is a localized problem that may be detected based on network alarm reports from serving nodes in an area. The device or core network problems may include a problem in which the radio performance of the user device within a normal performance range but a user is nevertheless having problems with the user device. A device type problem may be detected when the relative mean number of issues for a particular device model or operating system (OS) version, as normalized to the number of device types, is higher than other device models or device version by a predetermined amount or percentage.

The issue detection module 226 may generate alerts at the subscriber, the user device, and/or the network infrastructure element level. For example, the user alerts may include "unexpected voice quality degradation", "much lower coverage than average user", "Wi-Fi calling off and bad performance at home", "phone freeze", etc. The network alerts may include "poor voice performance with low traffic", "abnormal amount of handover failures", etc. The user device alerts may include "increased failures after software upgrade", "abnormal voice failures detected", "poor LTE radio reception detected", etc. In some embodiments, the alerts may provide or implement solutions for remedying faults. For example, when there is poor coverage, the corresponding user device alert may recommend that Wi-Fi calling be enabled on the user device. In another example, when there is an abnormal amount of handover failures, the corresponding network alert may trigger a modification of the handover rule that is used by base stations in a particular geographical area.

The detection rules and the alert rules that are used by the issue detection module 226 may be updated in order to detect new conditions or generate new types of alerts. The updated detection rules may include detection rules that have been modified in accordance with user feedback. In at least one embodiment, the issue detection module 226 may cause the user interface module 228 to generate a user interface that enables users to rate the usefulness of a detected condition using a numerical rating scale, a positive/negative rating scale, user comments, and/or so forth. In turn, an operator of the communication analytics engine 124 may edit or modify one or more corresponding detection rules that detected the condition to generate updated detection rules. Likewise, the updated alert rules may include rules that have been modified in accordance with user feedback. In at least one embodiment, the issue detection module 226 may cause the user interface module 228 to generate a user interface that enables users to rate the effectiveness of an alert using a numerical rating scale, a positive/negative rating scale, user comments, and/or so forth. In turn, an operator of the communication analytics engine 124 may edit or modify one or more corresponding alert rules to generate the updated alert rules.

The user interface module 228 may generate multiple analytic views that present the KPIs and related analytics data as produced by the KPI computation module 224. In various embodiments, the views may include a summary view, a subscriber aggregate view, a subscriber call view, a user device aggregate view, and a top offender view. The summary view may include a topology tree that specific time frames of the call data. For example, when a node of the topology tree is selected, the other information that is presented in the summary view may be updated. The summary view may further include a KPI selection control, a network map window, a time chart window, and a global performance control. The KPI selection control may be used to select specific KPIs that are to be shown in the network map window and the time chart window. The network map window may show VoLTE events clustered by geographic areas. The time chart window may show the historical value for each selected KPI.

The global performance window may show a series of performance KPIs that are aggregated at the selected node level, for example, for the last 24 hours. Such KPIs may include total calls in a time period, the percentage of circuit-switched (CS) voice calls in the time period, the percentage of VoLTE calls for the time period, the percentage of Wi-Fi calls for the time period, etc. The global performance window may further show a dropped call rate (DCR) for the time period, average failure rate (AFR) for the time period, call setup time (CST) during the time period, audio quality mean opinion score (MOS) for the time period, handover failure rate for the time period, and VoLTE coverage in a predetermined geographical area for the time period. In various embodiments, the MOS may be computed based on metrics reported by one or more user devices, in which the metrics may include measurements such as RTCP, delay, jitter, packet loss, and/or so forth.

In some embodiments, the summary view may further display a chart that shows voice quality ratings, such as good quality, medium quality, poor quality, or failed. Additionally, the summary view may also display a breakdown of voice problems, such as dropped calls, access failures, one-way audio, repeat calls, etc. The charts may be in the form of pie charts, bar charts, line charts, etc. The summary view may also present a chart that shows the performance comparison of VoLTE calling vs. Wi-Fi calling, such as comparisons of DCR, AFR, audio quality MOS, CST, coverage for voice over LTE (VoLTE) calling and Wi-Fi calling.

The subscriber aggregate view may present an aggregated view of mobile calling performance KPIs for a subscriber over a period of time. The subscriber aggregate view may include a mobile search box, an information panel, a time selection window, an aggregated CS call voice statistics window, an aggregated VoLTE statistics window, an aggregate Wi-Fi calling statistics window, a subscriber alerts window, and a view call control. The mobile search box may enable a user to search for information on a user device according to International Mobile Subscriber Identity (IMSI) or Mobile Station International Subscriber Directory Number (MSISDN). The information panel may present information on a user device. The information may include a mobile device number, the mobile device make and model, the software version, whether Wi-Fi calling is on or off, whether VoLTE is on or off, whether Wi-Fi calling is provisioned, whether VoLTE is provisioned, and/or so forth. The time selection window may enable a user to select a time interval for which KPIs by calculated, in which the default time interval may be one week. The aggregated CS call voice statistics window may show a percentage of time the user device engaged in CS calling, the DCR for the calls, the AFR for the calls, the audio quality MOS for the calls, the CST for the calls, the coverage for the calls, etc. Likewise, the aggregated VoLTE statistics window may show a percentage of time the user device engaged in voice over LTE (VoLTE) calling, the DCR for the calls, the AFR for the calls, the audio quality MOS for the calls, the CST for the calls, the coverage for the calls, etc. Additionally, the aggregated VoLTE statistics window may show a percentage of time the user device engaged in Wi-Fi calling, the DCR for the calls, the AFR for the calls, the audio quality MOS for the calls, the CST for the calls, the coverage for the calls, etc.

The subscriber alerts window may show a list of detected alerts for the user device during the time interval. The view calls control may open the subscriber call view for the subscriber associated with the selected user device. The subscriber call view may present detailed information about each call record for a particular subscriber of the wireless carrier network 102. Specifically, the subscriber call view may present a list of call records for a subscriber. Each call record may include a summary that includes a call time, a type of call (e.g., originating, terminating), a technology used by the call (e.g., CS, VoLTE, Wi-Fi calling), a duration of the call, a call status (e.g., call success, call drop, call access fail, and/or so forth). The subscriber call view may further include a KPI selection control. A user may use the KPI selection control to select a KPI that may be shown in a geographical map and/or as a chart. In some instances, the geographical map may show subscriber events.

The subscriber call view may further present a performance summary window for a selected call and a user device configuration window. The summary for the call presented in the performance summary window may include a call time, a type of call (e.g., originating, terminating), a technology used by the call (e.g., CS, VoLTE, Wi-Fi calling), a duration of the call, a call status (e.g., call success, call drop, call access fail, and/or so forth), an establishment time, an audio quality MOS, and coverage details for the call. The user device configuration window may provide configuration details for the user device, which may include a make of the user device, a model of the user device, and a software version of the user device, and/or so forth. Additionally, the subscriber call view may also present a time chart, an alert log, and a call log. The time chart may show historical values of selected KPIs. For example, handover events for the call may be displayed as dots in the chart. The alert log may list the detected alerts for the call, and the call log may list all the records for the call.

The user device aggregation view may show aggregated KPI statistics for a particular user device model. The user device aggregation view may include an OS version filter control, a model selection control, an aggregated user device statistics window, a top offender chart, and a user device alert window. The OS version filter control may enable the customization of the user device aggregation view to show aggregated statistics for specific OS versions or an aggregate of all OS versions. The model selection control may enable the customization of the user device aggregation view to show aggregated statistics for one or more user device models that are selected from a list of all user device models. The aggregated user device statistics window may display the percentage of call time that the user device is using VoLTE, CS, and Wi-Fi calling technology. For example, the percentages may be displayed as bar graphs, line graphs, or other types of graphs in the aggregate user device statistics window. The aggregate user device statistics window may also display the DCR, AFR, audio quality MOS, CST, and/or coverage details for the one or more selected user devices. The top offenders chart may presented a list with a predetermined number of user devices models with the worst performances for a selected KPI. The user device alert window may show a list of detected alerts for each worst performing user device model.

The top offender view may identify subscribers, user devices, and/or network infrastructure elements that have abnormally poor performance. The top offender view may include a topology tree control, a KPI selection control, a subscriber top offender chart, a user device top offender chart, a network cell top offender chart, and an alert window. The topology tree control may enable a user to select an area of a cellular network to be analysis by selecting a corresponding portion of the topology tree. The KPI control may enable the selection of a KPI for which the top offenders may be calculated. Accordingly, the subscriber top offender chart may show a predetermined number of worst subscribers for the selected KPI in the selected area. The user device top offender chart may show a predetermined number of worst user devices models for the selected KPI in the selected area. The network cell top offender chart may show a predetermined number of worst network cells for the selected KPI in the selected area. The alerts window may show subscriber, network, and/or user device alerts for any selected KPI.

In additional embodiments, the data collection platform 118 may support additional analytics engines that monitor and analyze the performance of the radio access network 106. These analytic engines may include a network analytics engine 230, an active testing engine 232, and a cross analytics engine 234. The computer instructions and algorithms of each engine may execute in conjunction with the data collection platform 118 to perform specific tasks. In various embodiments, the network analytics engine 230 may collect network performance data 122 on the radio access network 106 and/or the core network 108 via the data collection platform 118. Such network performance data 122 may include RAN OSS counters, VoLTE call traces, SIP trace data, RTCP trace data, and/or so forth. The RTCP trace data may enable the detection of an abnormal transmission gap in either an uplink direction or a downlink direction that indicates a one-way audio situation.

The active testing engine 232 may interface with a specific set of user devices that are equipped with testing applications. The testing applications may automatically generate voice and data communications on the radio access network 106. The voice and data communications may be generated on a periodic basis to enable the testing applications to regularly capture network performance data. In turn, the testing applications on the specific set of user devices may report the captured network performance data to the active testing engine. The captured network test data may include Mean Opinion Scores (MOS) on voice quality, Perceptual Objective Listening Quality Assessment (POLQA) measurements of speech quality, radio conditions of the base stations, Internet Protocol (IP) connection states, and/or so forth.

The cross analytics engine 234 may cross analyze the data captured by the communication analytics engine 124, the network analytics engine 230, and the active testing engine 232 to develop a comprehensive view on the performance of the radio access network 106. For example, the cross analytics engine 234 may develop a machine learning model for measuring Quality of Experience (QoE) based on data collected by the network analytics engine and the active testing engine. In turn, the machine learning model may be used to extrapolate QoE measurements (KPIs) for user devices that are not equipped with VoLTE performance data collection applications or device testing applications. In another example, the cross analytics engine 234 may correlate the data collected by the multiple engines to eliminate data anomalies or measurement outliers that may skew or distort QoE measurements for a set of user devices. Accordingly, the cross analysis of the device performance data, the network performance data, and the test performance data collected by the multiple engines may enable the generation of more comprehensive network performance measurements and statistics.

Example User Interface

Figure 3:
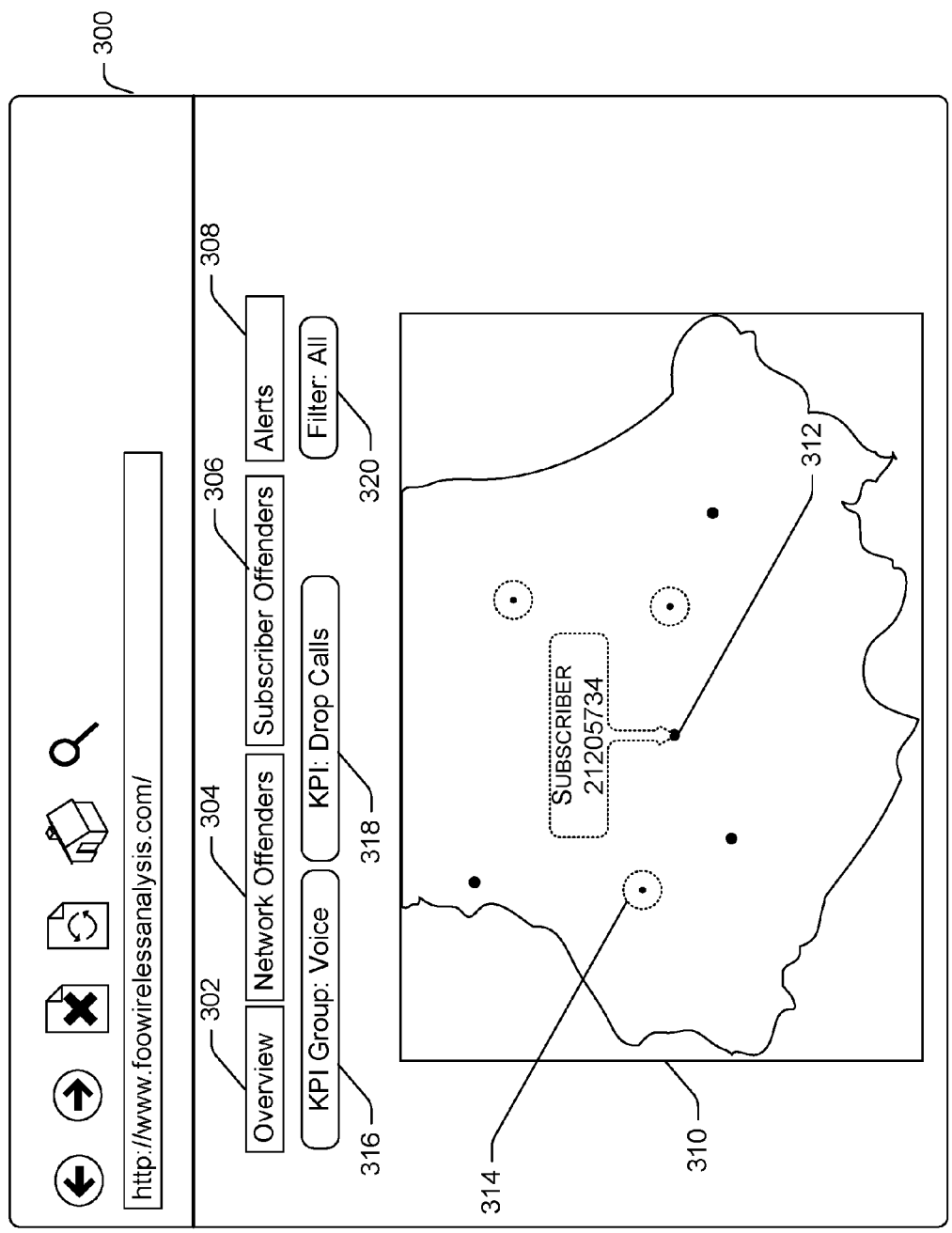
FIG. 3 is an illustrative user interface that provides key performance indicators information and other call related analytic information for display in response to user request inputs.

FIG. 3 is an illustrative user interface 300 that provides key performance indicators information and other call related analytic information for display in response to user request inputs. The user interface 300 may be used to perform root cause analysis with respect to call data for a particular time period within a specific geographical area. The user interface 300 may include an overview control 302, a network offender control 304, a subscriber offender control 306, and an alerts control 308. The overview control 302 may be activated to show a main view of call data for an area of interest that can be analyzed by the communication analytics engine 124. In various embodiments, the main view may include a map 310 of a geographical area that corresponds to the call data being displayed. The map 310 may show representations of user devices that are being used by the subscribers of the wireless carrier network 102. For example, the map 310 may show a representation 312, in which a user selection of the representation 312 may cause the user interface 300 to display additional device information of the user device or KPI that are calculated for the user device. The map 310 may also show events that are being monitored by the communication analytics engine 124. For example, the map 310 may show a network or device event 314 that is experienced by a group of user devices, such as dropped calls, low voice call quality, one-way audio, and/or so forth.

The user interface 300 may further include a KPI category control 316 and a KPI control 318. The KPI category control 316 may be used to select a category of KPIs to be calculated for the call data of the particular time period within the specific geographical area. Accordingly, the KPI category control 316 may be a drop down menu that shows categories of KPIs, such as KPIs for circuit-switch calls, VoLTE calls, or Wi-Fi calls. Once a category of KPIs is selected, the KPI control 318 may be activated to generate a drop down menu of KPIs that may be calculated. For example, the KPIs may include a DCR for a time period, an AFR for the time period, a CST, an audio quality MOS for the time period, and/or so forth, with respect to a selected call type in the specific geographical area. In some embodiments, the user interface 300 may have a filter control 320 that is used to select the type of analytic results for display on the map 310, such as KPIs, detected issues, and alerts.

The network offender control 304 may be activated to display a network offender view of one or more network infrastructure components, in which the number of abnormal operating conditions or failures caused by each of the network infrastructure component is above a predetermined threshold. Likewise, the subscriber offender control 306 may be activated to display a subscriber offender view of one or more user devices, in which the number of abnormal operating conditions or failures experienced by each user device is above a predetermined threshold. The alerts control 308 may be activated to display alerts that have been issued by the issue detection module 226 for network infrastructure components, user devices, user device models, and/or so forth. In additional embodiments, the user interface 300 may display other views that are generated by the communication analytics engine 124.

Example Processes

Figure 4:
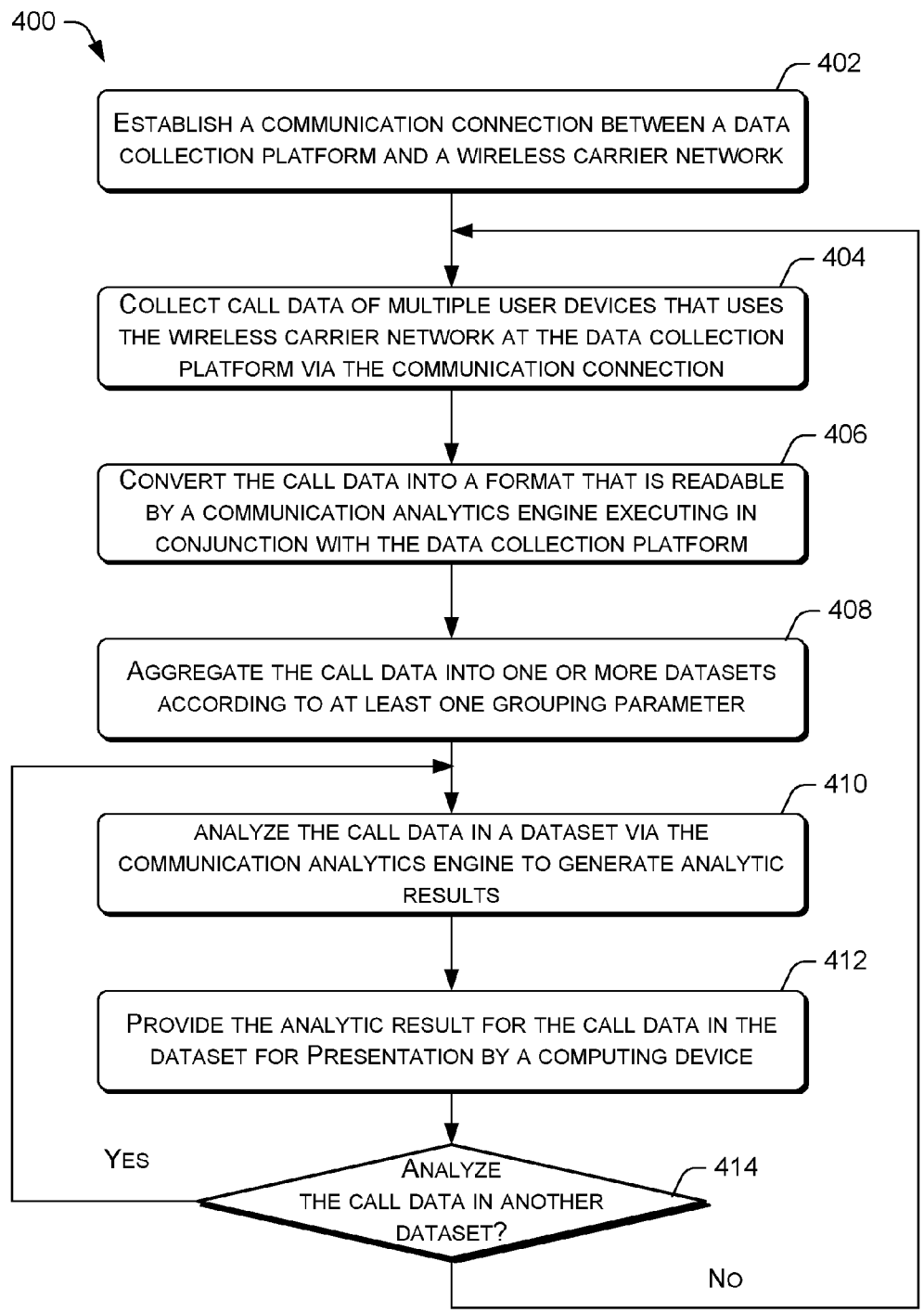
FIG. 4 is a flow diagram of an example process for implementing a communication analytics engine to collect and analyze call data of a wireless carrier network.
Figure 5:
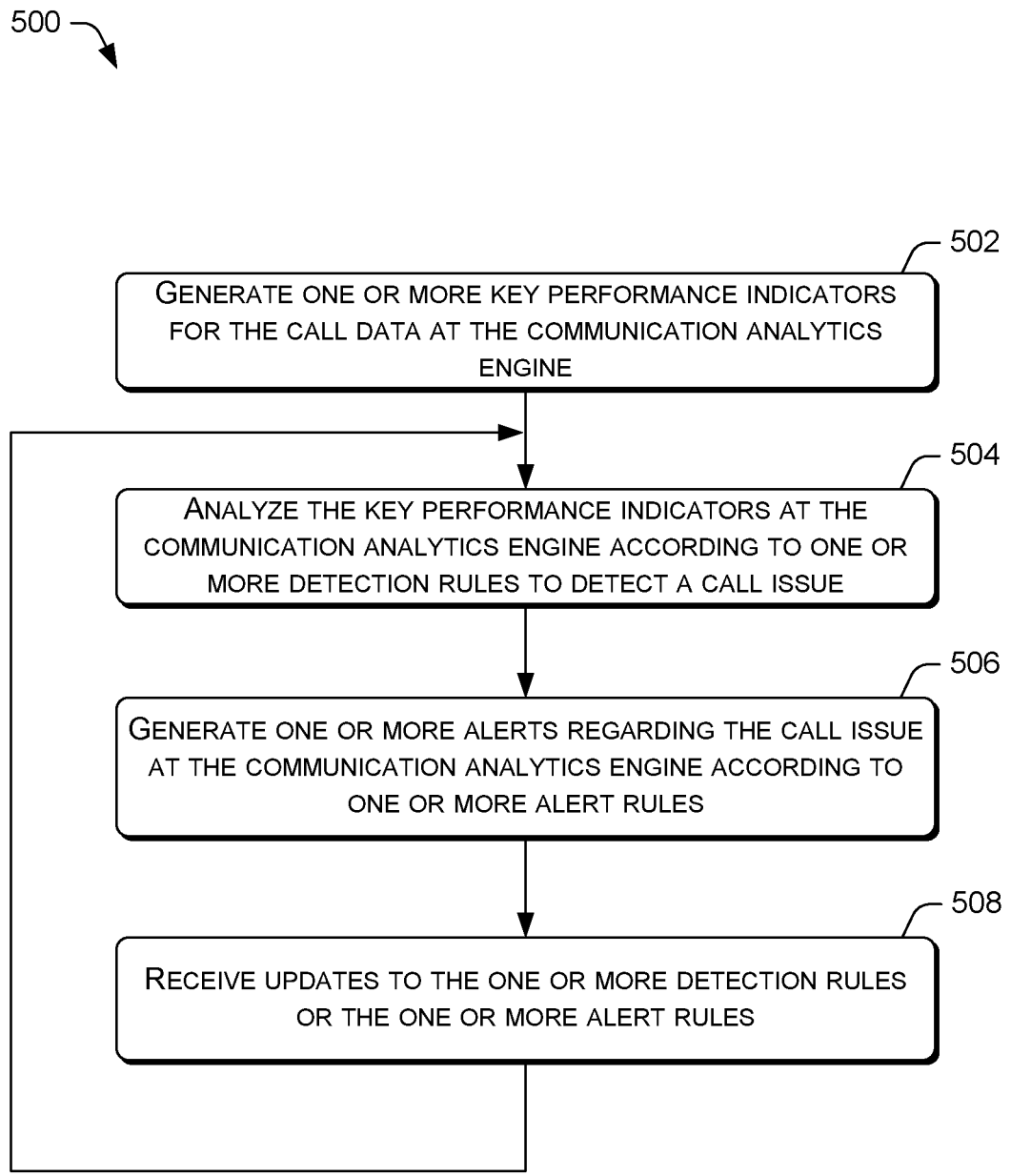
FIG. 5 is a flow diagram of an example process for detecting issues with respect to wireless communication and generating alerts regarding the issues.
Figure 6:
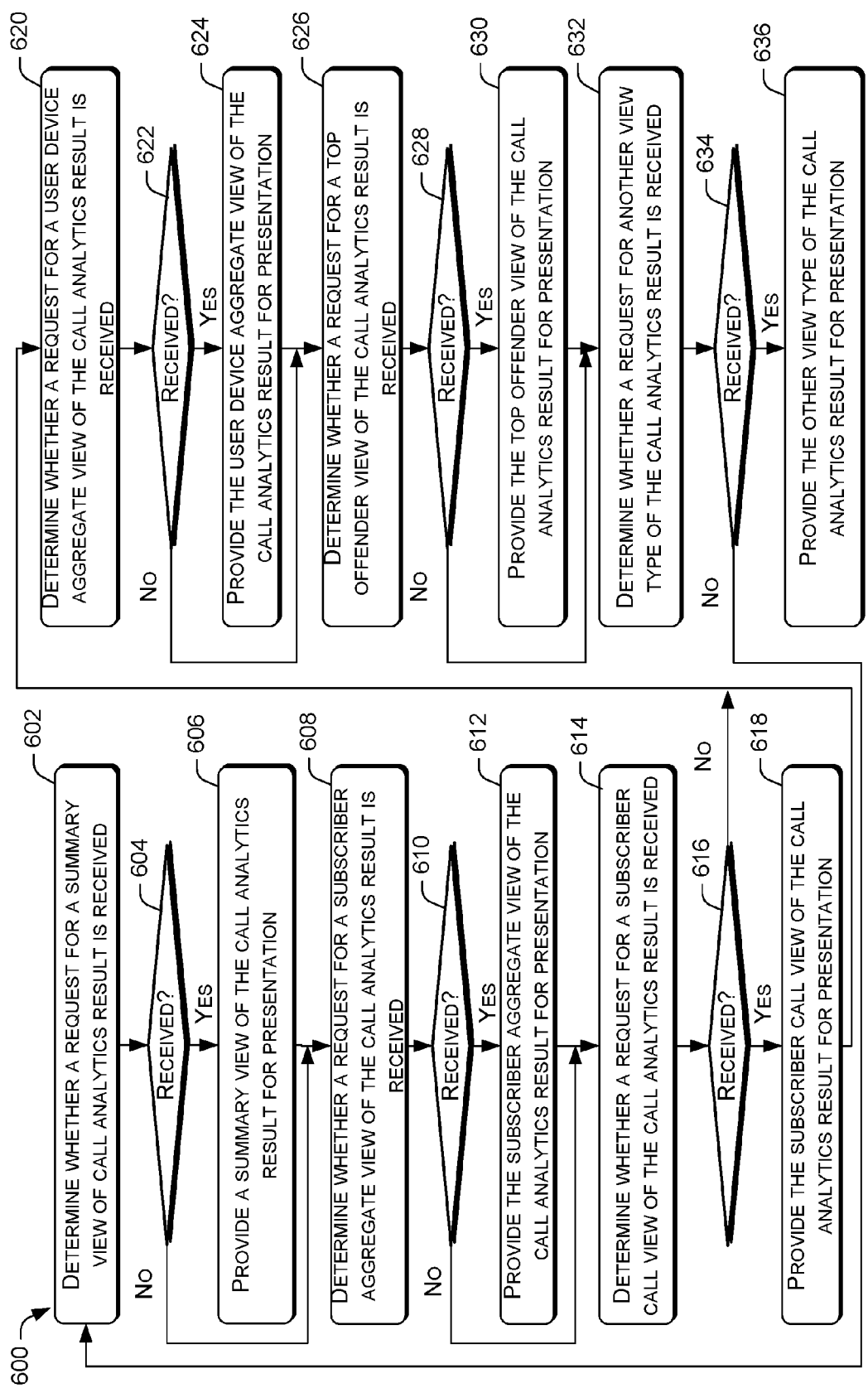
FIG. 6 is a flow diagram of an example process for providing views of call analytics data in accordance with user requests.

FIGS. 4-6 present illustrative processes 400-600 for performing communication data analysis and reporting. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process. For discussion purposes, the processes 400-600 are described with reference to the architecture 100 of FIG. 1.

FIG. 4 is a flow diagram of an example process 400 for implementing a communication analytics engine to collect and analyze call data of a wireless carrier network. At block 402, the data collection platform 118 may establish a communication connection with the wireless carrier network 102. In various embodiments, the communication connection may be established via the Internet 112. The communication connection may enable the data collection platform 118 to employ FTP, Hypertext Transfer Protocol (HTTP) posts, direct network infrastructure element connection, and/or other data transfer techniques to obtain the call data 116.

At block 404, the data collection platform 118 may collect the call data 116 of the user devices 104(1)-104(N) that are using the communication services provided by the wireless carrier network 102. The call data 116 may be generated by the device applications 114(1)-114(N) that are on the user devices 104(1)-104(N) as the device application monitor calls placed and received at the user devices 104(1)-104(N). In some embodiments, the calls may be in the form of VoLTE calls. The device applications 114(1)-114(N) may send the call data 116 to the core network 108 of the wireless carrier network 102. Accordingly, the call data 116 may be collected by the data collection platform 118 from the wireless carrier network 102 via the communication connection.

At block 406, the data collection platform 118 may convert the call data 116 into a format that is readable by the communication analytics engine 124 that executes in conjunction with the data collection platform 118. In various embodiments, the call data 116 that is collected for a particular time period may be in the form of input data files, i.e., JSON records. The data processing module 216 may merge call data as embodied in the JSON records into an integrated data file. Subsequently, the data processing module 216 may convert the information in the integrated data file into a converted format that is readable to the communication analytics engine 124.

At block 408, the communication analytics engine 124 may aggregate the call data 116 into data sets according to at least one grouping parameter. In various embodiments, the grouping parameters may include a time period, routing network component, user device manufacturer, user device model, and/or so forth.

At block 410, the communication analytics engine 124 may analyze the call data in a dataset. The analysis may include the calculation of one or more KPIs with respect to a usage of the wireless carrier network 102 by subscribers, user devices, and network infrastructure elements. In some instances, one or more KPIs may indicate an issue with a usage of the wireless carrier network 102 by one or more subscribers, an issue with one or more user devices, or an issue with one or more network infrastructure elements, and/so forth. Accordingly, the communication analytics engine 124 may generate one or more alerts regarding such issues.

At block 412, the communication analytics engine 124 may provide analytic result for the call data in the dataset for display on a computing device or a user device. In some embodiments, the analytics result may be in the form of one or more analytics reports that are provided for presentation on the computing device in response to view requests. The analytics may be provided to the computing device via an API of the communication analytics engine 124. For example, the one or more views may include a summary view, a subscriber aggregate view, a subscriber call view, a user device aggregate view, and/or a top offender view. In other embodiments, the analytic result may be in the form of one or more alerts that are provided for presentation on the computing device or an affected user device.

At decision block 414, the communication analytics engine 124 may determine whether the call data in another dataset is to be analyzed. In various embodiments, the communication analytics engine 124 may make the determination based on stored configuration settings or a manually inputted analysis request. Accordingly, if the communication analytics engine 124 determines that the call data in another dataset is to be analyzed ("yes" at decision block 414), the process 400 may loop back to block 410 so that additional dataset analysis may be performed. However, if the communication analytics engine 124 determines that no further datasets are to be analyzed ("no" at decision block 414), the process 400 may loop back to block 404, such that the data collection platform 118 may collect additional call data 116 from the user devices 104(1)-104(N).

FIG. 5 is a flow diagram of an example process 500 for detecting issues with respect to Wireless communication and generating alerts regarding the issues. The process 400 may further illustrate block 410 of the process 400. At block 502, the communication analytics engine 124 may generate one or more KPIs for the call data in a data set. For example, the KPIs may include a dropped call rate (DCR) for a time period, an average failure rate (AFR) for the time period, a call setup time (CST) during the time period, an audio quality mean opinion score (MOS) for the time period, handover failure rate for the time period, and coverage for the time period with respect to one or more subscribers, user devices, network infrastructure elements, and/or so forth. The KPIs may be generated based on custom KPI configuration settings, which may be modified via an updated KPI configuration file to enable the generation of additional or different KPIs.

At block 504, the communication analytics engine 124 may analyze the KPIs according one or more detection rules to detect a call issue. The call issue may be a condition that affects one or more user devices of subscribers or one or more network infrastructure elements of the wireless carrier network. In various embodiments, the detection rules may be modified or updated via a detection configuration file such that different or additional call issues may be detected.

At block 506, the communication analytics engine 124 may generate one or more alerts regarding the call issue according to one or more alert rules. For example, a series of KPIs that are generated by the communication analytics engine over time may trigger an alert that an abnormal condition is developing with respect to some VoLTE-related network infrastructure components of a wireless carrier network. In various embodiments, the alert rules may be modified or updated via an alert rule configuration file such that different or additional alerts concerning call issues may be initiated.

At block 508, the communication analytics engine 124 may receive updates to the one or more detection rules or the one or more alert rules. In various embodiments, the updates may be developed based on user feedback regarding the effectiveness of the detection rules in detecting call issues and/or the effectiveness of the alert rules. For example, a detection rule may be refined to be more sensitive to the detection of network infrastructure failure within the radio access network 106. In another example, an alert rule may be refined to provide a faster alert with respect to the failure of a LTE radio in a user device. Subsequently, the process 500 may loop back to block 504 such that additional detections and/or alerts may be performed based on the updated detection and/or alert rules.

FIG. 6 is a flow diagram of an example process 600 for providing views of call analytics data in accordance with user requests. At block 602, the communication analytics engine 124 may determine whether a request for a summary view of the call analytics results is received. In various embodiments, a view request may be initiated at a computing device and transmitted to the communication analytics engine 124 via an API provided by the communication analytics engine 124. Accordingly, at decision block 604, if the communication analytics engine 124 determines that the request for the summary view is received, the process 600 may continue to block 606. At block 606, the communication analytics engine 124 may provide the summary view of the call analytics results for presentation. For example, a provide view of the call analytics results may be received and displayed by the computing device.

At block 608, the communication analytics engine 124 may determine whether a request for a subscriber aggregate view of the call analytics result is received. Accordingly, at decision block 610, if the communication analytics engine 124 determines that the request for the subscriber aggregate view is received, the process 600 may proceed to block 612. At block 612, the communication analytics engine 124 may provide the subscriber aggregate view for presentation.

At block 614, the communication analytics engine 124 may determine whether a request for a subscriber call view of the call analytics result is received. Accordingly, at decision block 616, if the communication analytics engine 124 determines that the request for the subscriber call view is received, the process 600 may proceed to block 618. At block 618, the communication analytics engine 124 may provide the subscriber call view for presentation.

At block 620, the communication analytics engine 124 may determine whether a request for a user device aggregate view of the call analytics result is received. Accordingly, at decision block 622, if the communication analytics engine 124 determines that the request for the user device aggregate view is received, the process 600 may proceed to block 624. At block 624, the communication analytics engine 124 may provide the user device aggregate view for presentation.

At block 626, the communication analytics engine 124 may determine whether a request for a top offender view of the call analytics result is received. Accordingly, at decision block 628, if the communication analytics engine 124 determines that the request for the top offender view is received, the process 600 may proceed to block 630. At block 630, the communication analytics engine 124 may provide the top offender view for presentation.

At block 632, the communication analytics engine 124 may determine whether a request for another view of the call analytics result is received. The additional view may present a perspective on the call analytics results that is not presented by the other views. Accordingly, at decision block 634, if the communication analytics engine 124 determines that the request for the additional view is received, the process 600 may proceed to block 636. At block 636, the communication analytics engine 124 may provide the additional view for presentation.

Returning to decision block 604, if the communication analytics engine 124 determines that the request for the summary view is not received, the process 600 may proceed directly to block 608. Returning to decision block 610, if the communication analytics engine 124 determines that the request for the subscriber aggregate view is not received, the process 600 may proceed directly to block 614. Returning to decision block 616, if the communication analytics engine 124 determines that the request for the subscriber call view is not received, the process 600 may proceed directly to block 620. Returning to decision block 622, if the communication analytics engine 124 determines that the request for the user device aggregate view is not received, the process 600 may proceed directly to block 626. Returning to decision block 628, if the communication analytics engine 124 determines that the request for the top offender view is not received, the process 600 may proceed directly to block 632. Returning to decision block 634, if the communication analytics engine 124 determines that the request for the additional view is not received, the process 600 may loop back to block 602.

The implementation of the communication analytics engine to execute in conjunction with the data aggregation and processing platform may provide a unified and scalable solution for call data aggregation and processing. The data and aggregation and processing platform may enable the use of custom analytics engines to provide KPIs to a wireless carrier network for areas such as network development, operations, and customer care. The KPIs that are provided by the communication analytics engine from the call data may be otherwise overly burdensome or virtually impossible to manually obtain in a timely manner due to the large volume of call data that typically inundate a wireless carrier network. Further, the techniques may provide an advanced approach to customer care with proactive and individualized treatments of wireless subscribers in real time.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   establishing a communication connection between a data collection platform executing one or more computing devices and a wireless carrier network;
   collecting call data of multiple user devices at the data collection platform via the communication connection, wherein the multiple user devices use the wireless carrier network to initiate and receive calls to one or more additional devices;
   converting the call data into a format that is readable by a communication analytics engine that executes in conjunction with the data collection platform on the one or more computing devices;
   aggregating the call data into a plurality of data sets according to at least one grouping parameter;
   determining which key performance indicators (KPIs) to include in a first set of KPIs to compute for the call data corresponding to at least one data set of the plurality of data sets based on a KPI configuration file, the at least one data set including two or more data selected from the group consisting of device performance data, network performance data, and test performance data;

generating analytic results via the communication analytics engine, wherein generating the analytic results includes computing the first set of KPIs for the call data in the at least one data set by performing cross analysis between the two or more selected data;

analyzing one or more KPIs of the first set of KPIs at the communication analytics engine according to one or more detection rules to detect a call issue that affects one or more user devices using the wireless carrier network or one or more network infrastructure elements of the wireless carrier network;

generating one or more alerts regarding the detected call issue at the communication analytics engine according to at least one alert rule; and providing the one or more one or more alerts regarding the detected call issue to a computing device for presentation.

2. The one or more non-transitory computer-readable media of claim 1, wherein the acts further comprise:
providing a summary view, via a computing device, of the analytic results that includes a topology tree, wherein a node of the topology tree is selectable to show specific voice over LTE (VoLTE) KPI information for a particular time period, the specific VoLTE KPI information including at least one of a dropped call rate (DCR) for the particular time period, an average failure rate (AFR) for the particular time period, a call setup time (CST) during the particular time period, an audio quality mean opinion score (MOS) for the particular time period, a handover failure rate for the time period, and VoLTE coverage in a predetermined geographical area for the particular time period.

3. The one or more non-transitory computer-readable media of claim 2, wherein the summary view further displays at least one of a chart that shows voice quality ratings, a breakdown of voice problems that includes one or more of dropped calls, access failures, or repeat calls, or a chart that shows performance comparisons of one or more of the DCR, the AFR, the audio quality MOS, the CST for voice over LTE (VoLTE) calling and Wi-Fi calling.

4. The one or more non-transitory computer-readable media of claim 1, wherein the acts further comprise:
providing a subscriber aggregate view, via a computing device, of mobile calling performance KPI information for a subscriber over a time period that shows VoLTE calling and Wi-Fi calling statistics of the subscriber over the time period.

5. The one or more non-transitory computer-readable media of claim 1, wherein the acts further comprise:
providing a subscriber call view, via a computing device, that shows KPI information regarding call made by a subscriber that includes one or more of a duration of the call, a call success or failure status of the call, whether the call is an originating or terminating call, whether the call uses circuit-switched calling, VoLTE calling or Wi-Fi calling, or configuration details of the user device used to make the call.

6. The one or more non-transitory computer-readable media of claim 1, wherein the acts further comprise:
presenting a user device aggregate view, via a computing device, that shows aggregated KPI statistics for a particular user device model that includes at least one of a dropped call rate (DCR), an average failure rate (AFR), an audio quality mean opinion score (MOS), a call setup time (CST), or coverage details for the user device model.

7. The one or more non-transitory computer-readable media of claim 1, wherein the acts further comprise:
presenting a top offender view, via a computing device, that identifies a predetermined number of one or more subscribers, one or more user devices, or one or more network infrastructure components that have the worst performance for a selected KPI in a selected area.

8. The one or more non-transitory computer-readable media of claim 1, wherein the acts further comprises receiving user feedback regarding an effectiveness of the one or more detection rules and modifying the one or more detection rules according to the user feedback, or receiving the user feedback regarding the one or more alert rules and modifying the one or more alert rules according to the user feedback.

9. The one or more non-transitory computer-readable media of claim 1, wherein the collecting includes collecting corresponding call data of a user device that is provided by a device application on the user device that obtains the corresponding call data via an IP Multimedia Subsystem (IMS) stack trace.

10. The one or more non-transitory computer-readable media of claim 1, wherein the collecting includes collecting the call data via a data management layer of the data collection platform, the data collection platform further including a cloud layer that store the call data collected by the data management layer in multiple virtual data storage clusters.

11. A computer-implemented method, comprising:
establishing a communication connection between a data collection platform executing one or more computing devices and a wireless carrier network;

collecting call data of multiple user devices at the data collection platform via the communication connection, the multiple user devices use the wireless carrier network to initiate and receive calls to one or more additional devices;

converting the call data into a format that is readable by a communication analytics engine that executes in conjunction with the data collection platform on the one or more computing devices;

collecting network performance data from the wireless carrier network via one or more data adaptors;

aggregating the call data and the network performance data into a plurality of data sets according to at least one grouping parameter;

determining which key performance indicators (KPIs) to include in a first set of KPIs to compute for the call data and the network performance data corresponding to at least one data set of the plurality of data sets based on a KPI configuration file, the at least one data set including two or more data selected from the group consisting of device performance data, the network performance data, and test performance data; and generating analytic results via the communication analytics engine, wherein generating the analytic results includes computing the first set of KPIs for the call data and the network performance data in the at least one data set by performing cross analysis between the two or more selected data;

analyzing one or more KPIs of the first set of KPIs at the communication analytics engine according to one or more detection rules to detect a call issue that affects one or more user devices using the wireless carrier network or one or more network infrastructure elements of the wireless carrier network;

generating one or more alerts regarding the call issue at the communication analytics engine according to at least one alert rule; and providing the analytic results for the call data, including the one or more alerts regarding the call issue, to a computing device for presentation.

12. The computer-implemented method of claim 11, further comprising receiving user feedback regarding effectiveness of the one or more detection rules and modifying the one or more detection rules according to the user feedback, or receiving the user feedback regarding the one or more alert rules and modifying the one or more alert rules according to the user feedback.

13. The computer-implemented method of claim 12, wherein the collecting includes collecting corresponding call data of a user device that is provided by a device application on the user device that obtains the corresponding call data via an IP Multimedia Subsystem (IMS) stack trace.

14. A system, comprising:
one or more processors; and
memory including a plurality of computer-executable components that are executable by the one or more processors to perform a plurality of actions, the plurality of actions comprising:
establishing a communication connection between a data collection platform executed by the one or more processors and a wireless carrier network;
collecting call data of multiple user devices at the data collection platform via the communication connection, the multiple user devices use the wireless carrier network to initiate and receive calls to one or more additional devices;
aggregating the call data into one or more datasets according to at least one grouping parameter;
determining which key performance indicators (KPIs) to include in a first set of KPIs to compute for the call data corresponding to at least one data set of the one or more data sets based on a KPI configuration file, the at least one data set including two or more data selected from the group consisting of device performance data, network performance data, and test performance data; and
generating analytic results via a communication analytics engine, wherein generating the analytic results includes computing the first set of KPIs for the call data in the at least one data set by performing cross analysis between the two or more selected data;
analyzing the first set of KPIs at the communication analytics engine according to one or more detection rules to detect a call issue that affects one or more user devices using the wireless carrier network or one or more network infrastructure elements of the wireless carrier network; and
generating one or more alerts regarding the detected call issue at the communication analytics engine according to at least one alert rule.

15. The system of claim 14, wherein the plurality of actions further comprise at least one of providing the analytic results for the call data to a computing device for presentation or providing the one or more one or more alerts regarding the call issue to a computing device for presentation.

16. The system of claim 14, wherein the plurality of actions further comprise receiving user feedback regarding effectiveness of the one or more detection rules and modifying the one or more detection rules according to the user feedback, or receiving the user feedback regarding the one or more alert rules and modifying the one or more alert rules according to the user feedback.

17. The one or more non-transitory computer-readable media of claim 1, wherein the acts further comprise:
determining which KPIs to include in a second set of KPIs to compute for the call data corresponding to another data set of the plurality of data sets based on the KPI configuration file; and
computing the second set of KPIs, via the communication analytics engine, for the call data in the other data set.

18. The one or more non-transitory computer-readable media of claim 1, wherein the acts further comprise:
computing, with the communication analytics engine, one or more new KPIs from the call data corresponding to the at least one data set in response to at least one of: (a) detecting a modification of the KPI configuration file, or (b) detecting an addition of a new KPI configuration file.

19. The one or more non-transitory computer-readable media of claim 1, wherein the communication analytics engine comprises an interface to enable communication via one or more analytics engines that are configured to provide the first set of KPIs to the wireless carrier network, and wherein the one or more analytics engines are configured to provide different KPIs to different corporate sectors of the wireless carrier network.

20. The one or more non-transitory computer-readable media of claim 1,
wherein analyzing the one or more KPIs to detect the call issue includes detecting an anomaly in a performance of a user device or a network infrastructure element that deviates from a historical performance pattern.

21. The one or more non-transitory computer-readable media of claim 1, wherein the performance of the user devices is a Quality of Experience performance estimated using a machine learning model based on the network performance data, the test performance data, or both.

* * * * *